United States Patent
Chen et al.

(10) Patent No.: US 10,397,130 B2
(45) Date of Patent: Aug. 27, 2019

(54) MULTI-CLOUD RESOURCE RESERVATIONS

(71) Applicant: VMware, Inc., Palo Alto, CA (US)

(72) Inventors: Ping Chen, Shanghai (CN); Igor Stoyanov, Palo Alto, CA (US); Li Fang, Shanghai (CN); Yuanzhi Wang, Shanghai (CN)

(73) Assignee: VMWARE, INC., Palo Alto, CA (US)

( * ) Notice: Subject to any disclaimer, the term of this patent is extended or adjusted under 35 U.S.C. 154(b) by 104 days.

(21) Appl. No.: 15/348,993

(22) Filed: Nov. 11, 2016

(65) Prior Publication Data
US 2018/0139149 A1    May 17, 2018

(51) Int. Cl.
*G06F 9/50* (2006.01)
*H04L 12/24* (2006.01)
*H04L 29/08* (2006.01)
*H04L 12/911* (2013.01)

(52) U.S. Cl.
CPC ............ *H04L 47/72* (2013.01); *G06F 9/5072* (2013.01); *H04L 41/042* (2013.01); *H04L 41/0893* (2013.01); *H04L 41/0896* (2013.01); *H04L 41/12* (2013.01); *H04L 67/2809* (2013.01); *H04L 41/5096* (2013.01)

(58) Field of Classification Search
CPC ...... H04L 47/72; H04L 67/2809; H04L 67/10
See application file for complete search history.

(56) References Cited

U.S. PATENT DOCUMENTS

| | | | |
|---|---|---|---|
| 2012/0179824 A1* | 7/2012 | Jackson | G06F 9/5027 709/226 |
| 2012/0331113 A1* | 12/2012 | Jain | G06F 9/5072 709/220 |
| 2017/0109815 A1* | 4/2017 | Bai | G06Q 30/08 |
| 2017/0339070 A1* | 11/2017 | Chang | H04L 47/829 |
| 2018/0060400 A1* | 3/2018 | Wu | G06F 17/30545 |

* cited by examiner

*Primary Examiner* — Michael A Keller
*Assistant Examiner* — Austin J Moreau
(74) *Attorney, Agent, or Firm* — SU IP Consulting

(57) ABSTRACT

An example method for reserving resources in a multi-cloud environment may include receiving, by a reservation broker executing in the multi-cloud environment, a first client request to reserve a first cloud resource in a plurality of clouds. The plurality of clouds includes a corresponding plurality of cloud brokers. The method may include selecting, by the reservation broker, a first cloud broker from the plurality of cloud brokers based on a first reservation type associated with the first cloud resource. The first cloud broker corresponds to a first cloud selected from the plurality of clouds. The method may also include transmitting, by the reservation broker, a first reservation request to the first cloud broker. The first cloud broker is configured to reserve the first cloud resource in the first cloud based on the first reservation request.

18 Claims, 3 Drawing Sheets

MULTI-CLOUD RESOURCE RESERVATIONS

BACKGROUND

A cloud automation product may be used to perform cloud management operations on a cloud system. The resources and services provided by the cloud system are designed for shared usage. When certain cloud resource does not have the capacity to accommodate multiple cloud service consumers' requirements, a cloud resource constraint may occur. Other types of runtime conflicts can occur when a cloud resource (especially one not specifically designed to accommodate sharing) is concurrently accessed by different cloud service consumers. For example, when one resource pool can temporarily borrow resources from other resource pools, a runtime conflict can be triggered when the borrowed resource is not returned due to prolonged usage by the borrowing cloud service consumer.

In order to reduce or eliminate issues caused by resource constraints and conflicts, the cloud management operations often include the allocating and reserving of resources by multiple cloud service consumers. Different cloud systems may have different approaches to isolate and reserve their respective cloud resources. Thus, having a consistent approach to reserve multi-cloud resources to ensure resources from multiple different cloud systems may be uniformly shared and pooled for common access can be challenging.

SUMMARY

System and methods for reserving resources in a multi-cloud environment are provided. The method may include receiving, by a reservation broker executing in the multi-cloud environment, a first client request to reserve a first cloud resource in a plurality of clouds. The plurality of clouds includes a corresponding plurality of cloud brokers. The reservation broker is configured to communicate with each of the plurality of cloud brokers. The method may include selecting, by the reservation broker, a first cloud broker from the plurality of cloud brokers based on a first reservation type associated with the first cloud resource. The first cloud broker corresponds to a first cloud selected from the plurality of clouds. The method may further include transmitting, by the reservation broker, a first reservation request to the first cloud broker. The first cloud broker is configured to reserve the first cloud resource in the first cloud based on the first reservation request.

DETAILED DESCRIPTION

Figure 1:
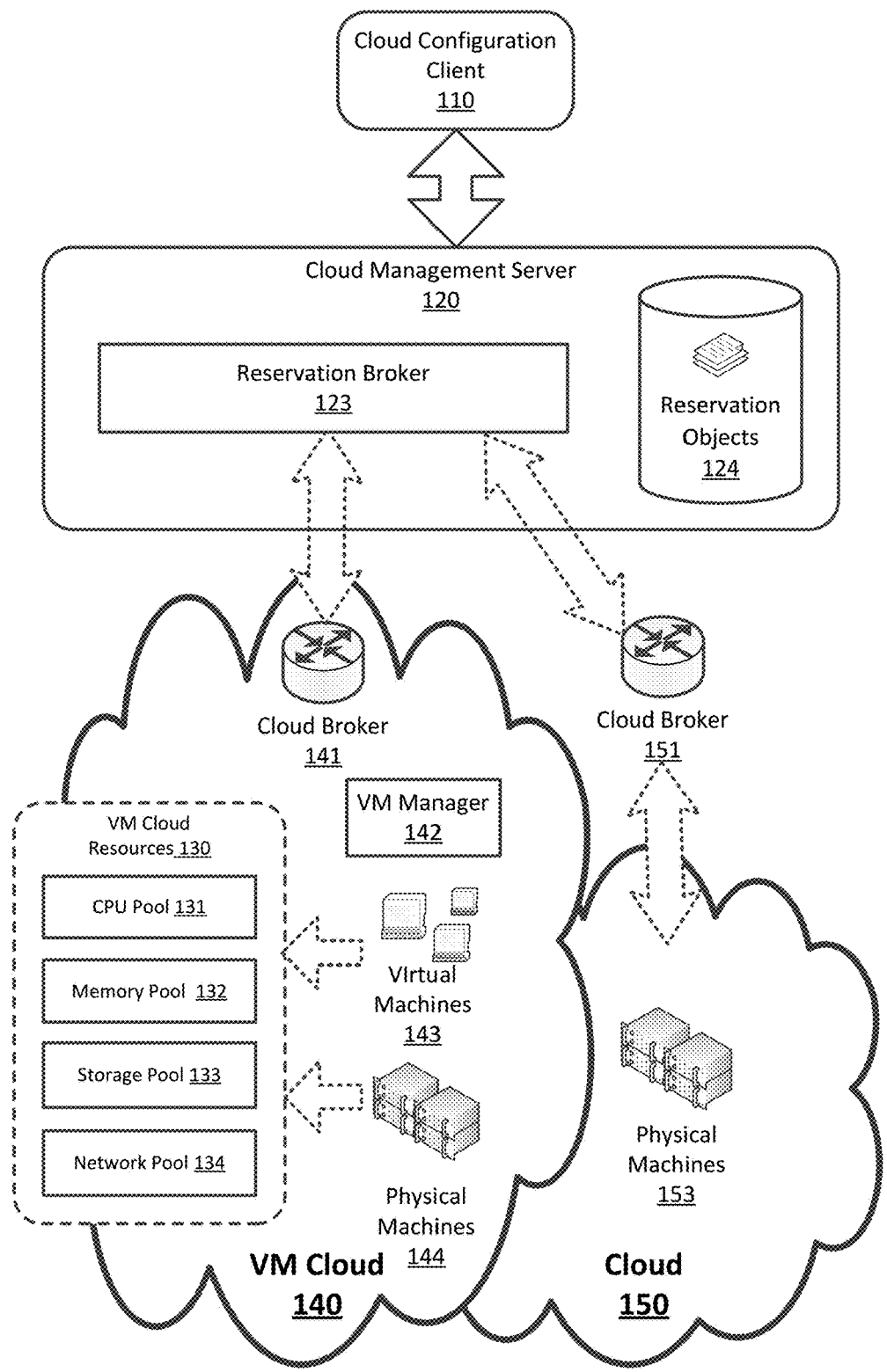
FIG. 1 illustrates a block diagram of a virtualized system capable of performing cloud resource reservation in a multi-cloud environment, according to one or more embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

FIG. 1 illustrates a block diagram of a system capable of performing cloud resource reservation in a multi-cloud environment, according to one or more embodiments of the present disclosure. In FIG. 1, the multi-cloud environment may include one or more VM clouds 140 and one or more clouds 150. The system may include a cloud management server 120, which may interact with one or more cloud configuration clients 110. The cloud management server 120 may be configured to manage the clouds 140 and 150 in the multi-cloud environment. Specifically, the cloud management server 120 may be configured to perform cloud resources reservations in the multi-cloud environment.

In some embodiments, a "cloud" (e.g., the cloud 150) in the multi-cloud environment may be a network-based, computing architecture that provides shared pools of cloud resources on demand. In comparison, a "VM cloud" in the multi-cloud environment may be a cloud implemented using some virtualized computing resources. The VM cloud 140 may contain, among other components, one or more VMs (e.g., VMs 143 and VMs 153). The cloud 150 may contain, among other components, one or more physical machines 153. The cloud management server 120 may be responsible for managing the VM cloud 140 and cloud 150, and implementing the various cloud functionalities such as resource pooling, resource provisioning, high-availability, and automation etc. In some embodiments, the VM cloud 140 may be constructed using products such as VMWARE® vCloud. The cloud management server 120 may be implemented using a VMWARE® vRealize Suite.

In some embodiments, the cloud configuration client 110 may be installed on a client computer (e.g., a personal computer or workstation) to connect to the cloud management server 120 for accessing and managing the clouds 140 and 150, as well as the VMs contained therein. The cloud configuration client 110 may interact with the cloud management server 120 via Transmission Control Protocol/Internet Protocol (TCP/IP), Hypertext Transfer Protocol (HTTP), or any other network communication means. Alternatively, the cloud configuration client 110 may be implemented as a software/hardware module executing directly on the cloud management server 120. In some embodiments, the cloud configuration client 110 may be implemented using a VMWARE® vSphere client.

In some embodiments, the cloud management server 120 may construct a VM cloud (e.g., VM cloud 140) using a VM manager 142. Specifically, the VM manager 142 may create one or more VMs 143 in the VM cloud 140, and provide centralized management of the VMs 143 such as managing VM creation, VM configuration, VM updates, VM cloning, etc. Based on the created VMs 143, the VM manager 142 may construct the VM cloud 140, and implement cloud-based functionalities such as VM high-availability, VM load-balancing, VM resource distributions, etc. In some embodiments, the VM manager 142 may be a VMWARE® vCenter server installed on MICROSOFT WINDOWS® server or a LINUX® server.

In some embodiments, the VM manager 142 may create a VM 143 based on one or more physical machines 144. The physical machine 144 may be a physical computer system with a physical hardware platform (e.g., an x86 architecture platform) and a hypervisor, which is configured to construct a virtual hardware platform for the VMs 143 based on the physical hardware platform. The VM manager 142 may coordinate the multiple VMs 143 to form a distributed (virtual) system (e.g., the VM cloud 140). Thus, the VM cloud 140 may be constructed based on the multiple physical machines 144 and the multiple VMs 143, which are supported by some of the physical machines 144.

In some embodiments, the physical machines 144 may include various "physical hardware components" such as, without limitation, one or more physical Central Processing Units (CPUs), physical memory, physical storage (e.g., hard drive), physical Network Interface Card (NIC), and/or additional electronic circuit components (all of which are not shown in FIG. 1). The physical CPU may be a general-purpose or specialized computing processor having electronic circuitry to perform arithmetical, logical, and input/output operations for the physical hardware platform. The physical CPU may be configured to support functions of the VM 143 and/or the VM manager 142. The physical memory may be hardware storage devices having integrated circuits for storing information used in the VM manager 142 and VMs 143. The physical memory may be volatile memory (e.g., dynamic random-access memory (DRAM) or CPU cache memory) or non-volatile memory (e.g., hard drive or flash memory). In some embodiments, the physical memory may be non-transitory computer-readable storage medium, containing a set of instructions which, when executed by the physical CPU, cause the physical CPU to perform methods of cloud resource reservation in the multi-cloud environment. The NIC may be network communication hardware for transmitting messages in the VM cloud 140.

In some embodiments, the virtual hardware platform of the VM 143 may be configured with one or more "virtual hardware components" such as, without limitation, one or more virtual CPUs, virtual memory, virtual storage, virtual NIC, and/or additional virtual components. With helps from the VM manager 142, the virtual hardware components may emulate the behaviors and the computing capabilities of the physical hardware components, thereby allowing the VM 143 to function as if it were a physical machine 144. In some embodiments, the VM manager 142 may install a guest operating system (OS) and various software applications onto the VM 143. The OS may be a WINDOWS®, UNIX®, LINUX®, or iOS® operating system. The software applications may include any network, storage, graphic, or business applications that can be executed on the VMs 143 based on the OS. After the OS and applications are configured, the VM manager 142 may deploy the VM 143 into the VM cloud 140 to provide various cloud-based services.

In some embodiments, the VM manager 142 may discover and pool all the resources in the VM cloud 140 together to form the VM cloud resources 130. Specifically, the VM manager 142 may pool resources from all the physical machines 144 and all the VMs 143 together into multiple resource pools. For example, the VM manager 142 may pool all the physical CPUs and the virtual CPUs together into a CPU pool 131. The VM manager 142 may collect all the physical and virtual memory into a memory pool 132. Further, the VM manager 142 may gather all the physical and virtual storages into a storage pool 133, and all the physical and virtual network resources into a network pool 134. In some embodiments, the VM manager 142 may further include the applications and cloud services implemented based on the VMs 143 as parts of the VM cloud resources 130. The VM cloud resources 130 may also be referred to as the "cloud resources" for VM cloud 140.

In some embodiments, the cloud 150 may be constructed based on physical machines 153. In this case, the cloud 150 may include a cloud manager (not shown in FIG. 1) configured to gather all the physical resources of the physical machines 153 into cloud resources, such as physical CPU pool, physical memory pool, physical storage pool, and/or physical network pool. The cloud manager of the cloud 150 may then provide these cloud resource to its cloud resource consumers. For clarification purposes, the cloud 150 may represent any third-party cloud implemented using various cloud products. For example, the cloud 150 may be implemented using products such as OpenStack® Cloud, and/or AMAZON® S3 Cloud.

In some embodiments, a "cloud resource consumer" may be an application or a system desired to utilize the cloud resources provided by the clouds 140 and/or the cloud 150. In this case, the cloud resource consumer may utilize the cloud management server 120 to perform a cloud resource reservation operation, in order to preserve the required cloud resources for its usage. In some situations, the requested cloud resources may be in multiple clouds 140 and 150. The clouds 140 and 150 may have different physical hardware components, and/or have different configurations to their virtual hardware components. Thus, the cloud management server 120 needs to perform different cloud-based operations to reserve cloud resources in these clouds 140 and 150.

In some embodiments, the cloud management server 120 may include a reservation broker 123, which is configured to perform cloud resource reservations in a multi-cloud environment. "Reservation" may refer to an operation to guarantee a minimum amount (in terms of quantity or percentage) of certain cloud resources for a particular cloud resource consumer. In other instances, reserved cloud resources may then be allocated to various operations and users by the cloud resource consumer. In response to a reservation request, the reservation broker 123 may put aside the minimum amount of cloud resources, and make them exclusively available only to the designated cloud service consumer. The reservation broker 123 may avoid potential resource conflicts, such as resource constraints and resource borrowing, by never actually sharing the reserved VM cloud resources 130 among multiple cloud resource consumers.

For example, a cloud service consumer may wish to set a lower bound on the cloud resources that can be allocated to a VM 143, or wish to guarantee that a particular VM 143 is allocated with a higher percentage of the cloud resources than other VMs 143 in the VM cloud 140. In this case, a user or application may utilize the cloud configuration client 110 to transmit a client reservation request to the cloud management server 120, for it to perform a resource reservation operation and establish suitable reservation policies in the VM cloud 140.

In some embodiments, the reservation broker 123 may also contain administration controls tools for cloud services consumers to create and manage multi-cloud resource reservations. The reservation broker 123 may allow the consumers to provision or release (un-reserve) previously reserved resources. The reservation broker 123 may also work with the VM manager 142 to keep track of the VM cloud resources 130 that are not reserved and can still be shared (or borrowed), and monitor resource usages that may affect the reserved cloud resources. Further, the reservation broker 123 may be responsible for locking and borrowing of the reserved cloud resources.

In some embodiments, the reservation broker 123 may need to perform resource reservation operations on different VM cloud 140 and cloud 150. Alternatively, the resource broker 123 may need to create a multi-cloud reservation on VM cloud resources 130 that spread across multiple clouds 140 and 150. As each of the clouds 140 and 150 may be implemented using different vendors' products or have different configurations, rather than directly interacting with the clouds 140 and 150, the reservation broker 123 may utilize multiple cloud brokers 141 and 151 to create and manage reservations in a uniform and consistent approach. In other words, the reservation broker 123 may communicate with the cloud brokers 141 and 151, in order to reserve multi-cloud resources located in different clouds in a uniform and consistent way.

In some embodiments, a "cloud broker" may be an application or module configured to reserve cloud resources in a specific cloud. In other words, each cloud broker may be tailored to a specific cloud, and can perform reservation-related tasks in view of the cloud's customized implementation and configurations. For example, the cloud broker 141 may be configured to perform reservations in the VM cloud 140, not the VM 150; and the cloud broker 151 may be configured to perform reservation tasks in the cloud 150, not in the VM cloud 140. Thus, each of the clouds 140 and 150 may be associated with a corresponding cloud broker (e.g., cloud broker 141 for VM cloud 140, and cloud broker 151 for cloud 150) dedicated to perform reservation-related tasks in the cloud it is associated with. Alternatively, a cloud broker may be configured to perform operations on reservations that spread across multiple clouds. For example, the cloud broker 151 may be configured to create, update, or release reservations only in the cloud 150, while the cloud broker 141 may be configured to create, update, or release reservations that spread among the clouds 140 and 150.

In some embodiments, the cloud broker 141 may be implemented as a component or service of the VM cloud 140. In other words, the cloud broker 141 may be operating within the VM cloud 140's environment. Alternatively, the cloud broker 151 may be implemented as an application or service external to the cloud 150. In this case, the cloud broker 151 may be located at a third-party system, acting as a cloud service customer of the cloud 150, and may perform reservation-related operations using network communications with the cloud 150. In addition, the cloud broker 151 may also be installed as a component of the cloud management server 120, and may interact with the reservation broker 123 using communications internal within the cloud management server 120.

In some embodiments, the cloud brokers 141 and 151 may utilize reservation types to communicate with the reservation broker 123 with respect to the cloud resources available for reservation in a particular cloud. Specifically, a "reservation type" may be a data structure to define the type of cloud resources on which the cloud broker 141 is capable of performing a reservation-related operation. Thus, the cloud broker 141 may supply a first set of reservation types to the reservation broker 123 with respect to the cloud resources in VM cloud 140, while the cloud broker 151 may supply a second set of reservation types to the reservation broker 123 with respect to the cloud resources in cloud 150. Some of the reservation types in the first set and the second set may be similar, while other in these two sets may be different. In other words, a cloud broker may support a reservation type that may not be supported by another cloud broker. For example, the VM cloud 140 may include mobile network communication services, while the cloud 150 may only provide conventional network communication services. In this case, the cloud broker 141 may support a specific reservation type "mobile network", while the cloud broker 151 may not.

As illustrated by an example below, a reservation type may include fields such as "id" or "name" to uniquely identifying itself. The reservation type may also include a field "cloud_broker_id" to store the identifier of the specific cloud broker it is associated with. The reservation type may further include a "schema" to describe the various cloud resources the cloud broker may be configured to reserve. Different cloud resources may need different approaches to describe. In a first approach, a simple cloud resource can be defined using a single value, such as a number, a string, or an object. A complex cloud resource may be described using a set of values, a complex data structure, or a set of objects. For a set of values, the cloud resource may be picked from a set of permissible selections. For example, a storage cloud resource may be selected from all virtual storages in the VM cloud. To populate the permissible selections, the reservation broker 123 may utilize a query operation to fetch the suitable resources from the clouds 140 and 150.

```
Reservation Type
{
    Id = "cloud.reservation.vsphere_s3",
    Name = "vSphere S3",
    cloud_broker_id = 2,
    "schema":
    {resource[1]
        {id = "memory",
            Name = "Memory (MB)",
            data_type = "integer"},
        resource[2]
        {id = "storages",
            Name = "Storages (GB)",
            data_type:
            { type = "set",
                element_type_id = cloud.reservation.vsphere_s3.storage"
        }},
    resource[3]
        {id = "backup storage",
            name = "Backup Storage in S3 (GB)",
            data_type = "integer"},
    }
}
```

In the above example, the reservation type includes a schema with three cloud resources defined. The first cloud resource "resource [1]" may be a "memory" resource definable using an "integer." The second cloud resource "resource [2]" may be a "storage" resource definable using a set of values. Specifically, the set of values may be queried and retrieved by the reservation broker 123 based on a uniform resource locator (URL). The third cloud resource "resource [3]" may be a "backup storage" resource that can be described with an integer. Based on this reservation type, the reservation broker 123 may be able to provide to the cloud configuration client 110 a list of cloud resources on the VM cloud 140 that can be reserved, and may be able to determine which cloud broker it may utilize to perform the reservation-related tasks related to this list of cloud resources.

In some embodiments, to communicate the reservation types to the reservation broker 123, the cloud brokers 141 and 151 may register their respective supported reservation types with the reservation broker 123 in a registration process. The reservation broker 123, which may serve as the only reservation interface to the multi-cloud environment, is responsible for handling various reservation related operation requests from the cloud configuration client 110. Thus, the cloud configuration client 110 does not need to communicate with each of the clouds 140 and 150, and can rely on a generic service interface provided by the reservation broker 123 for managing the reservations. The reservation broker 123 may then use the corresponding cloud brokers 141 and 151 to communicate with the clouds 140 and 150. The cloud brokers 141 and 151 may then perform the actual reservation-related operations in their respective clouds 140 and 150.

In some embodiments, the cloud configuration client 110 may transmit different client requests to the cloud management server 120, requesting the reservation broker 123 to perform various reservation-related management operations and query operations. The management operations may include, without limitations, create-reservation, update-reservation, or release-reservation operations. The query operations may include query-for-reservations, query-for-reservation-types, query-for-reservation-type-schema, and query-for-permissible-values-of-resource. Thus, the cloud configuration client 110 and the reservation broker 123 may need a mechanism to identify the specific cloud resource on which the management operations or the query operations may perform.

In some embodiments, the cloud configuration client 110 and/or the reservation broker 123 may utilize reservation objects to describe the particular cloud resources to be reserved. Specifically, a "reservation object" may be a data structure to define cloud resources on which reservation-related operations may perform. The reservation object may include identification information, such as a unique reservation id, the name of the reservation type, and other common properties. The reservation object may further include "resource data" to identify the cloud resources being targeted for reservation. The structure of the resource data may be based on the schema of the reservation types previously registered with the reservation broker 123, and may include a series of resource-literal pairs. Thus, the reservation types may be used to define what cloud resources can be reserved, and the reservation objects may be used to describe which cloud resources shall be reserved.

As illustrated by an example below, a reservation object may include a field such as "name" to uniquely identifying itself, and a "reservation_type_id" to specify which reservation type this reservation object is based upon. Further, the reservation object may include resource data, which describes three cloud resources to be reserved. In the example, the first cloud resource may be "memory", and the quantity/amount of such resource to be reserved is "300 MB." The second cloud resource may be "storages", which includes two pieces of data that are chosen from a set of permissible selections provided in a reservation type's schema. Each of these two pieces of data may include corresponding "type_id" and "storage_id" to identify a particular storage resource, and may include a respective reservation size (e.g., "500 MB" or "800 MB"). The third cloud resource may be "backup_storage", with a quantity of "1000 MB."

```
Reservation Object
{
    Name = "vSphere_S3_Reservation_01",
    reservation_type_id = "cloud.reservation.vsphere_s3",
    priority = 1,
    resources_data: {
        {   key = "memory",
            Value = 300},
        {   key = "storages",
            value: [
                {   type_id = "cloud.reservation.vsphere_s3.storage",
                    storage_id = "f48a527b-30a6-4d54-8829-f549bc195b69" ,
                    reserved_size = "500"},
                {   type_id = "cloud.reservation.vsphere_s3.storage",
                    storage_id = "4e51fabc-19e8-4e79-b413-d52309b3bb62",
                    reserved_size = "800"}}
            ]},
        {   key = "backup_storage",
            Value = 1000}
    }
}
```

In some embodiments, the cloud configuration client 110 may create the reservation objects based on reservation types provide by the reservation broker 123. Afterward, the cloud configuration client 110 may transmit the reservation objects to the reservation broker 123 via client requests. The reservation broker 123 may utilize the reservation objects to perform its reservation-related tasks, and may store these reservation objects 124 in a data storage (e.g., database) managed by the cloud management server 120. The stored reservation objects 124 may subsequently be used in additional reservation-related operations (e.g., provisioning or releasing operations).

Figure 2:
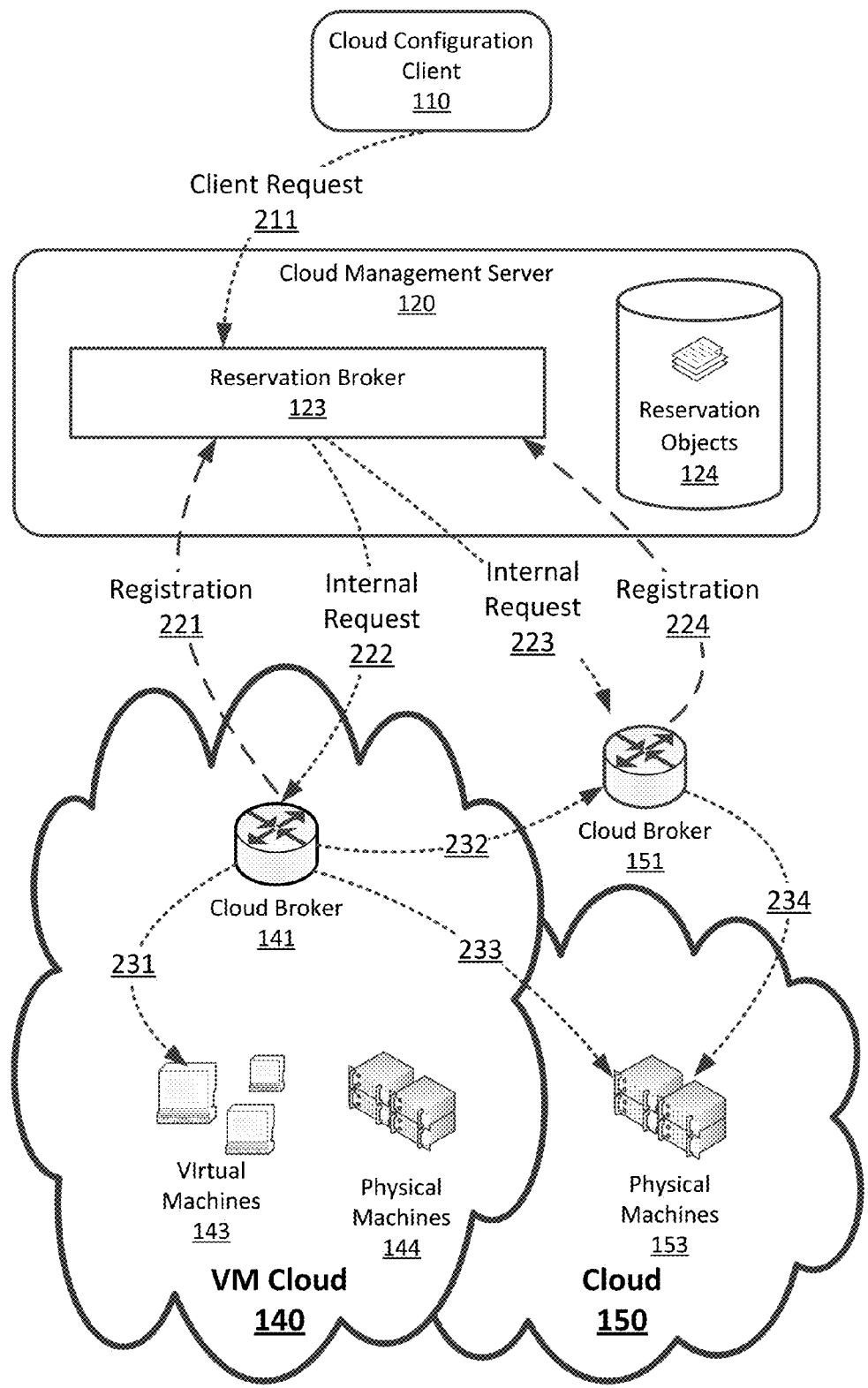
FIG. 2 illustrates a virtualized environment configured to provide multi-cloud reservation operations, according to one or more embodiments of the present disclosure.

FIG. 2 illustrates a virtualized environment configured to provide multi-cloud reservation operations, according to one or more embodiments of the present disclosure. In FIG. 2, the cloud configuration client 110, the cloud management server 120, the clouds 140 and 150, as well as the relevant components contained therein, correspond to their respective counterparts in FIG. 1.

In some embodiments, before the reservation broker 123 is ready to perform any reservation-related tasks, each of the cloud brokers 141 and 151 may transmit a corresponding "registration" request to the reservation broker 123 to register the reservation types it supports. Specifically, the cloud broker 141 may transmit (221) a first registration request to the reservation broker 123, registering all the reservation types it may be able to handle. Likewise, the cloud broker 151 may transmit (223) a second registration request to the reservation broker 123, registering its supported reservation types. After the initial registration processes, the reservation broker 123 may be ready to accept reservation-related requests from the cloud configuration client 110.

In some embodiments, the requested cloud resources may spread across multiple clouds 140 and 150. In this case, the cloud broker 151 may first transmit a registration request to the cloud broker 141, transmitting the reservation types the cloud broker 151 may be able to handle. Afterward, the cloud broker 141 may transmit a second registration request to the reservation broker 123, registering the cloud broker 151's supported reservation types on behalf of the cloud broker 151. Thus, the reservation broker 123 may identify the cloud broker 141 to accept reservation-related requests for cloud 150.

In some embodiments, the cloud configuration client 110 may transmit (211) one or more client requests to the reservation broker 123, requesting for reservation-related operations in the multi-cloud environment. Specifically, the client requests from the cloud configuration client 110 may request for management operations (e.g., create-reservation, update-reservation, release-reservation), query operations (e.g., query—for-reservation), or any operations associated with reservation. Each client request may further include a reservation object 124 configured to identify the cloud resource it may seek to operate upon.

For example, for a create-reservation client request, the reservation object 124 may include a reservation object 124 identifying the cloud resource and the specific amount of resource it may seek to reserve. The cloud configuration client 110 may construct this reservation object 124 and transmit (211) it via the client request to the reservation broker 123. When the client request is associated with an already-existing reservation in the multi-cloud environment, the cloud configuration client 110 may construct the reservation object 124 with information that can be used to identify such existing reservation in the multi-cloud environment. Alternatively, the cloud configuration client 110 may transmit (211) an identifier with the client request to the reservation broker 123. The reservation broker 123 may retrieve the reservation object 124 from the database based on this identifier.

In some embodiments after received the client request, the reservation broker 123 may extract the reservation object contained therein, and perform certain security check and validations. The reservation broker 123 may validate the reservation type defined in the reservation object to make sure that at least one of the cloud brokers 141 has registered such reservation type beforehand. Afterward, the reservation broker 123 may extract the schema from the reservation type associated with the reservation object, and validate the resource data contained in the reservation object 124 against the schema.

In some embodiments, after the reservation validation is completed and passed, the reservation broker 123 may identify one of the cloud brokers (e.g., cloud broker 141) that can handle the reservation type associated with the reservation object 124, and construct a reservation-related internal request according to the reservation object 124 and the client request. Afterward, the reservation broker 123 may transmit (222) the reservation-related internal request, which may contain the reservation object 124, to this cloud broker 141.

In some embodiments, once the cloud broker 141 received the reservation-related internal request, it may perform (231) the reservation-related operation based on the internal request. Specifically, it may identify the specific cloud resources according to the reservation object 124 transmitted along with the reservation-related internal request. In some embodiments, the requested cloud resources may spread across multiple clouds 140 and 150. In this case, the cloud broker 141 may transmit (233) a reservation-related inter-cloud request to the external cloud 150 (i.e., cloud 150 being external to the VM cloud 140). In other words, the cloud broker 141 may transmit a cloud-to-cloud communication to remotely perform the reservation operation on the cloud 150. Alternatively, the cloud broker 141 may transmit (232) the reservation-related inter-cloud request to the cloud broker 151 that is associated with the cloud 150. The cloud broker 151 may then perform (234) the reservation-related operation on the cloud 150 based on the reservation object 124 transmitted along with the reservation-related inter-cloud request.

In some embodiments, the cloud configuration client 110 may transmit (211) another client request to the reservation broker 123, requesting for reservation-related operations in the Cloud 150. In this case, the reservation broker 123 may identify cloud broker 151 as the one that is associated with the cloud 150, and construct a reservation-related internal request according to the reservation object 124 contained in the client request. Afterward, the reservation broker 123 may transmit (223) the reservation-related internal request to this cloud broker 151, which may in turn perform the corresponding reservation-related operations on the cloud 150.

In some embodiments, the reservation broker 123 may determine that the cloud resource identified by the client request may spread across multiple clouds 140 and 150. In this case, in addition to the above identifying of the cloud broker 141, the reservation broker 123 may identify cloud broker 151 as the cloud broker that can handle the cloud resource in the cloud 150. Concurrent to the constructing and transmitting of (222) of a first reservation-related internal request to this cloud broker 141, the reservation broker 123 may construct a second reservation-related internal request according to the reservation object in the client request, and transmit (223) the second reservation-related internal request to this cloud broker 151. Once the cloud broker 151 received this internal request, it may perform (234) the reservation operation based on the internal request. Specifically, parallel to the cloud broker 151 reserving part of the cloud resources that is in the cloud 150, the cloud broker 141 may simultaneously/concurrently reserve other part of the cloud resources that is in the VM cloud 140.

In some embodiments, once the cloud broker 141 successfully performed the reservation-related operation in the VM cloud 140 and/or cloud 150, it may return a success response to the reservation broker 123. Alternatively, if the reservation-related operation failed to reserve the necessary cloud resources in the clouds 140 and 150, the cloud broker 141 may roll-back all already-performed operations to restore the clouds 140 and 150 back to their original states before the reservation-related operation. Specifically, the cloud broker 141 may release any cloud resources that have been reserved during the failed reservation-related operation, and restore any changes to the configurations in the clouds 140 and 150 as well. Afterward, the cloud broker 141 may return a failed response to the reservation broker 123.

In some embodiments, once the reservation broker 123 received the success message from the cloud broker 141, it may save the reservation object 124 in its database, and return a success message in response to the client request 211 back to the cloud configuration client 110. If the reservation broker 123 received the failed message from the cloud broker 141, it will not save the reservation object 124 in its database, and will instead return a failed message in response to the client request 211 back to the cloud configuration client 110. Through the above approaches, multi-cloud resources can be isolated, reserved and managed in a uniform approach. Furthermore, additional services (e.g. allocation service or provisioning service) can use the same approaches to perform various cloud automation operations on those reserved resources.

Figure 3:
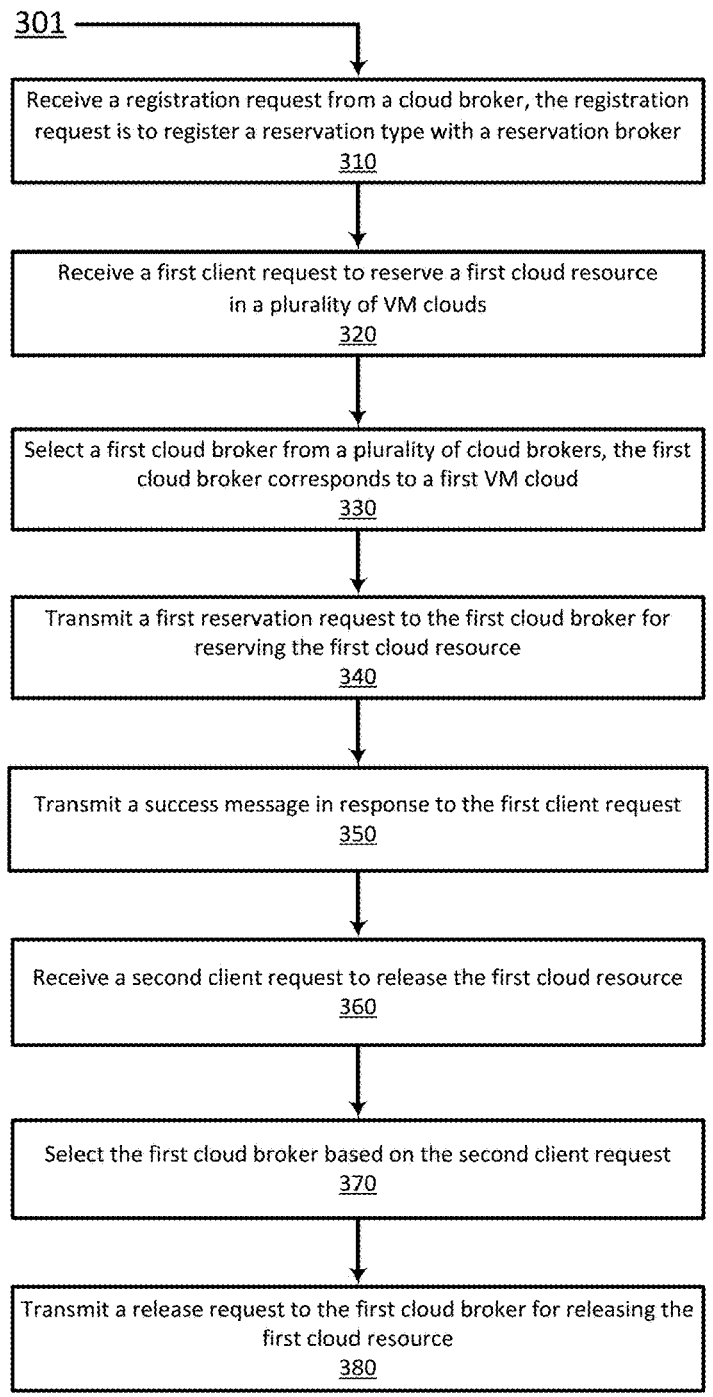
FIG. 3 shows a flow diagram illustrating a process to reserve cloud resources in a multi-cloud environment, according to one or more embodiments of the present disclosure.

FIG. 3 shows a flow diagram illustrating a process to reserve cloud resources in a multi-cloud environment, according to one or more embodiments of the present disclosure. The processes 301 may set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 3 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 310, the multi-cloud environment may include a plurality of VM clouds and a cloud management server. The plurality of VM clouds may be associated with a corresponding plurality of cloud brokers. Specifically, each one of the plurality of VM clouds may be associated with a corresponding one of the plurality of cloud brokers. A reservation broker of the cloud management server may be configured to communicate with each of the plurality of cloud brokers. In some embodiments, the reservation broker may receive a corresponding registration request from each of the plurality of cloud brokers. The registration request is to register one or more reservation types with the reservation broker. Each of the reservation types may include a schema defining a specific cloud resource provided by the plurality of VM clouds.

At block 320, the reservation broker may receive a first client request from a cloud configuration client. The first client request may request the reservation of a first cloud resource in the plurality of VM clouds. Alternatively, the first client request may be related to reserving a cloud resource. For example, the first client request may request the reservation broker to perform reservation-related operation such as update-reservation, release-reservation, or query-reservation based on an already-existing reservation in the plurality of VM clouds.

In some embodiments, the reservation broker may extract a reservation object from the first client request. The reservation broker may utilize the reservation object to identify the first cloud resource as well as a first reservation type selected from the one or more reservation types. The first reservation type may be associated with the first cloud resource. And the reservation object may be constructed based on the first reservation type.

At block 330, the reservation broker may select a first cloud broker from the plurality of cloud brokers based on the first reservation type. The first cloud broker may correspond to a first VM cloud selected from the plurality of VM clouds.

At block 340, the reservation broker may transmit a first reservation request to the first cloud broker. In response to the first reservation request, the first cloud broker may be configured to reserve the first cloud resource in the first VM cloud. The first reservation request may include the first reservation object, which may be used to identify the first cloud resource.

In some embodiments, the first cloud resource may be located in the first VM cloud and a second VM cloud selected from the plurality of VM clouds. In other words, the first cloud resource may spread across the first VM cloud and the second VM cloud. In this case, concurrent to the transmitting of the first reservation request to the first cloud broker, the first cloud broker may be configured to transmit a second reservation request to the second VM cloud for reserving the part of the first cloud resource that is located in the second VM cloud. Alternatively, the first cloud broker may be configured to transmit the second reservation request to a second cloud broker associated with the second VM cloud. And concurrent to the first cloud broker reserving a first part of the first cloud resource in the first VM cloud, the second cloud broker may be configured to reserve a second part of the first cloud resource in the second VM cloud based on the second reservation request.

In some embodiments, the reservation broker may select the second cloud broker from the plurality of cloud brokers based on the first reservation type associated with the first cloud resource. In this case, the reservation broker may transmit the second reservation request directly to the second cloud broker, rather than via the first cloud broker. Thus, concurrent to the first cloud broker reserving a first part of the first cloud resource in the first VM cloud, the second cloud broker may be configured to reserve a second part of the first cloud resource in the second VM cloud based on the second reservation request.

In some embodiments, subsequent to the processing of the first client request, the reservation broker may receive a second client request to reserve a second cloud resource in the plurality of VM clouds. Specifically, the second cloud resource may be located in a second VM cloud selected from the plurality of VM clouds. In this case, the reservation broker may select a second cloud broker from the plurality of cloud brokers based on a second reservation type. The second client request may include a second reservation object, which may be constructed based on the second reservation type. Further, the second reservation object and the second reservation type may all be associated with the second cloud resource. Afterward, the reservation broker may transmit a second reservation request to the second cloud broker. The second cloud broker may be configured to reserve the second cloud resource in the second VM cloud based on the second reservation request.

At block 350, in response to a determination that the first cloud broker successfully reserved the first cloud resource in the first VM cloud, the reservation broker may transmit a success message to the cloud configuration client as a response to the first client request. Further, the reservation broker may store the reservation object in a database.

At block 360, the reservation broker may receive another client request to release the already-reserved first cloud resource. This client request may include a reservation object that can be used to identify the first cloud resource.

At block 370, the reservation broker may select the first cloud broker from the plurality of cloud brokers based on the reservation object.

At block 380, the reservation broker may transmit a release request to the first cloud broker. In response to the release request, the first cloud broker may be configured to release the reserved first cloud resource in the first VM cloud.

Thus, systems and methods for reserving resources in a multi-cloud environment have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations.

In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term non-transitory computer readable storage medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-ft or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for reserving resources in a multi-cloud environment, the method comprising:
   receiving, by a reservation broker executing in the multi-cloud environment, a first registration request from a first cloud broker associated with a first cloud selected from a plurality of clouds, wherein
      the first cloud broker generates the first registration request based on a second registration request, which is received by the first cloud broker from a second cloud broker associated with a second cloud selected from the plurality of clouds,
      the second registration request is to register a first cloud resource in the second cloud with the first cloud broker, and
      the first registration request is to register the first cloud resource with the reservation broker on behalf of the second cloud broker;
   receiving, by the reservation broker, a first client request to reserve the first cloud resource in the plurality of clouds, wherein the first client request includes a first reservation type associated with first cloud resource, and the plurality of clouds correspond to a plurality of cloud brokers including the first cloud broker and the second cloud broker;

selecting, by the reservation broker, the first cloud broker from the plurality of cloud brokers based on the first reservation type associated with the first cloud resource; and transmitting, by the reservation broker, a first reservation request to the first cloud broker, wherein the first cloud broker is configured to reserve the first cloud resource in the second cloud based on the first reservation request.

2. The method as recited in the claim 1, further comprising:

selecting, by the first cloud broker, the second cloud broker from the plurality of cloud brokers based on the first reservation type associated with the first cloud resource; and transmitting, by the first cloud broker, a second reservation request to the second cloud broker, wherein the second cloud broker is configured to reserve the first cloud resource in the second cloud based on the second reservation request.

3. The method as recited in the claim 1, wherein the reservation broker is configured to transmit a second reservation request to the second cloud broker for reserving the first cloud resource in the second cloud.

4. The method as recited in the claim 1, further comprising:

receiving, by the reservation broker, a second client request to reserve a second cloud resource in the plurality of clouds;

selecting, by the reservation broker, the second cloud broker from the plurality of cloud brokers based on a second reservation type associated with the second cloud resource; and transmitting, by the reservation broker, a second reservation request to the second cloud broker, wherein the second cloud broker is configured to reserve the second cloud resource in the second cloud based on the second reservation request.

5. The method as recited in the claim 1, further comprising:

extracting, by the reservation broker, a reservation object from the first client request, wherein the reservation object identifies the first reservation type and the first cloud resource to be reserved.

6. The method as recited in the claim 5, further comprising:

in response to the determination that the first cloud broker successfully reserved the first cloud resource in the second cloud, storing, by the reservation broker, the reservation object in a database.

7. The method as recited in the claim 5, further comprising:

receiving, by the reservation broker, a second client request to release the first cloud resource, wherein the second client request is associated with the reservation object; and selecting, by the reservation broker, the first cloud broker from the plurality of cloud brokers based on the reservation object; and transmitting, by the reservation broker, a release request to the first cloud broker, wherein the first cloud broker is configured to release the reserved first cloud resource in the second cloud.

8. The method as recited in the claim 5, wherein the reservation object is constructed based on the first reservation type.

9. The method as recited in the claim 1, wherein the first reservation type includes a schema to define cloud resources that can be reserved in the plurality of clouds.

10. A non-transitory computer-readable storage medium, containing a set of instructions which, in response to execution by a processor, cause the processor to perform a method for reserving resources in a multi-cloud environment, the method comprising:

receiving, by a reservation broker executing in a management server, a first registration request from a first cloud broker associated with a first virtual machine (VM) cloud selected from a plurality of VM clouds, wherein the first cloud broker generates the first registration request based on a second registration request, which is received by the first cloud broker from a second cloud broker associated with a second VM cloud selected from the plurality of VM clouds, the second registration request is to register a cloud resource in the second VM cloud with the first cloud broker, and the first registration request is to register the cloud resource with the reservation broker on behalf of the second cloud broker;

receiving, by the reservation broker, a client request related to reserving the cloud resource in the plurality of VM clouds, wherein the first client request includes a first reservation type, and the reservation broker is configured to interact with a plurality of cloud brokers associated with the plurality of VM clouds;

selecting, by the reservation broker, the first cloud broker from the plurality of cloud brokers based on the first reservation type associated with the cloud resource; and transmitting, by the reservation broker, a reservation request to the first cloud broker, wherein the first cloud broker is configured to perform a reservation-related operation on the cloud resource based on the client request; and in response to a determination that the first cloud broker successfully performs the reservation-related operation, transmitting, by the reservation broker, a success message in response to the client request.

11. The non-transitory computer-readable storage medium of the claim 10, wherein the method further comprising:

prior to the receiving of the client request, receiving, by the reservation broker, a corresponding registration request from each of the plurality of cloud brokers, wherein the registration requests from the plurality of cloud brokers include a plurality of reservation types associated with cloud resources in the plurality of VM clouds.

12. The non-transitory computer-readable storage medium of the claim 11, wherein the method further comprising:

extracting, by the reservation broker, a reservation object from the client request, wherein the reservation object is constructed based on one of the plurality of reservation types that is associated with the cloud resource.

13. The non-transitory computer-readable storage medium of the claim 12, wherein the selecting of the cloud broker from the plurality of cloud brokers based on the cloud resource further comprising:

identifying, by the reservation broker, the cloud resource based on the reservation object;

identifying, by the reservation broker, the VM cloud the cloud resource belongs to; and selecting the cloud broker from the plurality of cloud brokers for associating with the VM cloud.

14. The non-transitory computer-readable storage medium of the claim 11, wherein the reservation-related operation includes create-reservation, update-reservation, release-reservation, or query-reservation.

15. The non-transitory computer-readable storage medium of the claim 11, wherein the cloud resource includes virtualized resources provided by one or more VMs in the VM cloud.

16. A system for reserving resources in a multi-cloud environment, the system comprising a processor and memory coupled with the processor, wherein the memory is configured to provide the processor with instructions for
    receiving, by a reservation broker executing in the multi-cloud environment, a first registration request from a first cloud broker associated with a first virtual machine (VM) cloud selected from a plurality of VM clouds, wherein
        the first cloud broker generates the first registration request based on a second registration request, which is received by the first cloud broker from a second cloud broker associated with a second VM cloud selected from the plurality of VM clouds,
        the second registration request is to register a first cloud resource in the second VM cloud with the first cloud broker, and
        the first registration request is to register the first cloud resource with the reservation broker on behalf of the second cloud broker;
    receiving, by the reservation broker, a first client request to reserve the first cloud resource in the plurality of VM clouds, wherein the first client request includes a first reservation type, and the plurality of VM clouds includes a corresponding plurality of cloud brokers;
    selecting, by the reservation broker, the first cloud broker from the plurality of cloud brokers based on the first reservation type associated with the first cloud resource; and
    transmitting, by the reservation broker, a first reservation request to the first cloud broker, wherein the first cloud broker is configured to reserve the first cloud resource in the second VM cloud based on the first reservation request.

17. The system of claim 16, wherein the memory is further configured to provide the processor with instructions for:
    selecting, by the first cloud broker, the second cloud broker from the plurality of cloud brokers based on the first reservation type associated with the first cloud resource; and
    transmitting, by the first cloud broker, a second reservation request to the second cloud broker, wherein the second cloud broker is configured to reserve the first cloud resource in the second VM cloud based on the second reservation request.

18. The system of claim 16, wherein the memory is further configured to provide the processor with instructions for:
    receiving, by the reservation broker, a second client request to reserve a second cloud resource in the plurality of VM clouds;
    selecting, by the reservation broker, the second cloud broker from the plurality of cloud brokers based on a second reservation type associated with the second cloud resource; and
    transmitting, by the reservation broker, a second reservation request to the second cloud broker, wherein the second cloud broker is configured to reserve the second cloud resource in the second VM cloud based on the second reservation request.

* * * * *